Figure 6:
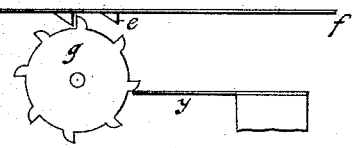

(No Model.) 6 Sheets—Sheet 1.
F. PIETSCHMANN.
MECHANICAL MUSICAL INSTRUMENT.
No. 491,223. Patented Feb. 7, 1893.
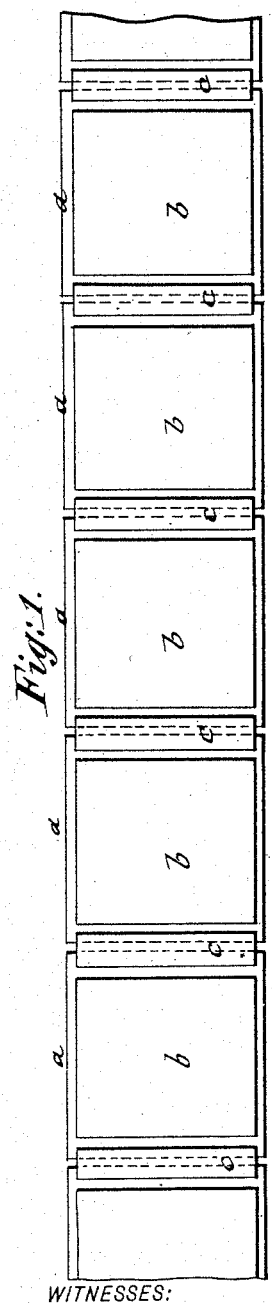
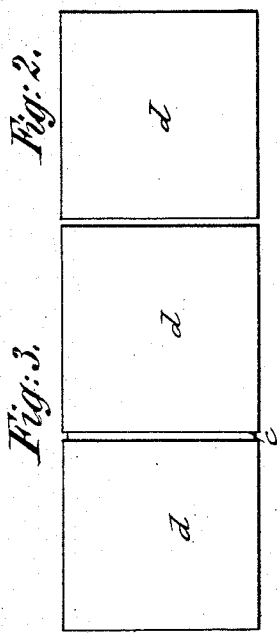
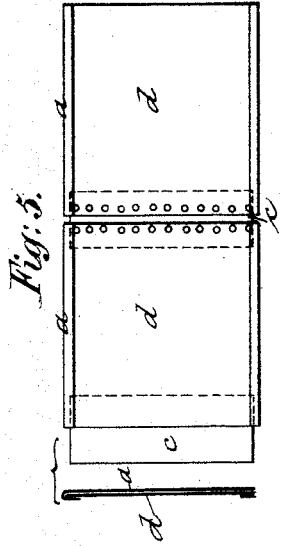
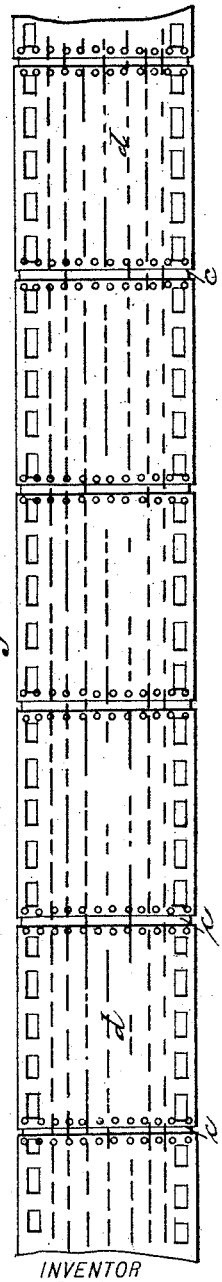
WITNESSES:
Charles Schroeder
William Duehm
INVENTOR
F. Pietschmann
BY Goepel & Raegener
ATTORNEYS.

(No Model.) 6 Sheets—Sheet 2.

F. PIETSCHMANN.
MECHANICAL MUSICAL INSTRUMENT.

No. 491,223. Patented Feb. 7, 1893.

WITNESSES:
Charles Schroeder
William Duehm

INVENTOR
F. Pietschmann
BY Goepel & Raegener
ATTORNEYS.

(No Model.) 6 Sheets—Sheet 3.
F. PIETSCHMANN.
MECHANICAL MUSICAL INSTRUMENT.
No. 491,223. Patented Feb. 7, 1893.
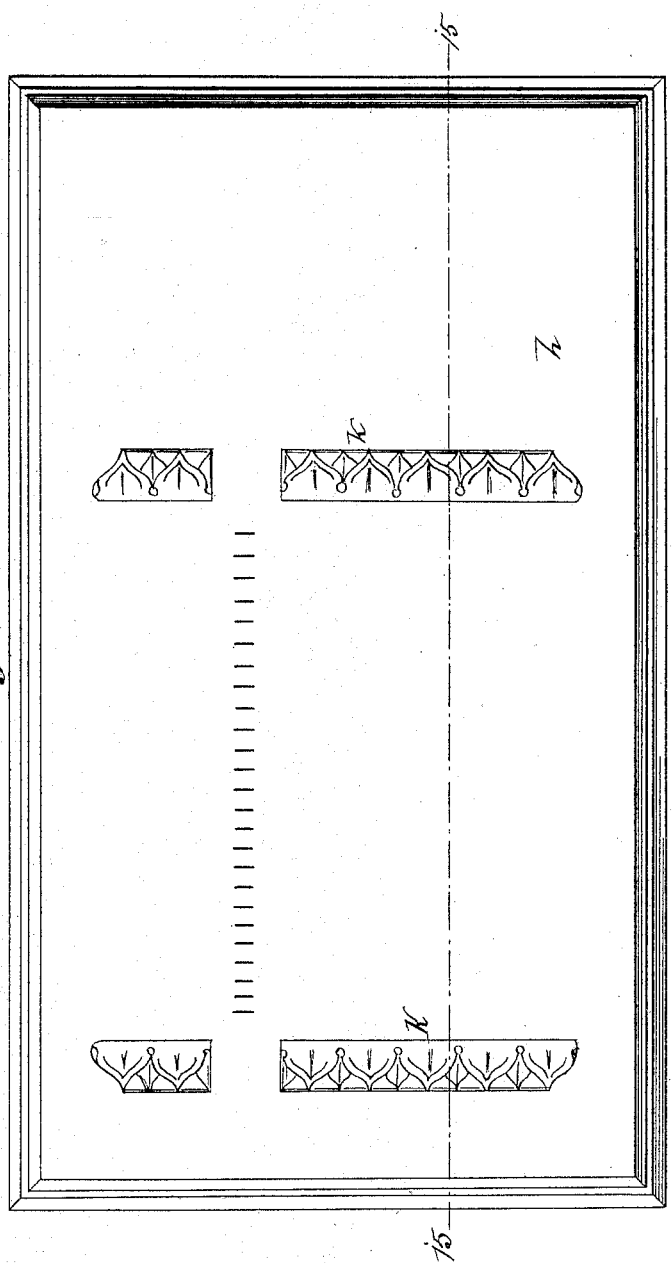
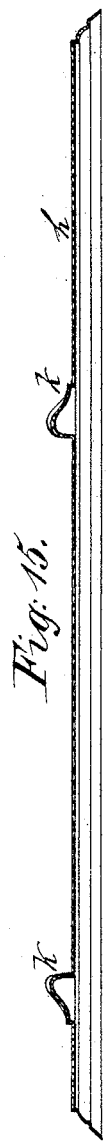
WITNESSES:
INVENTOR
ATTORNEYS (No Model.)  6 Sheets—Sheet 4.
F. PIETSCHMANN.
MECHANICAL MUSICAL INSTRUMENT.
No. 491,223.  Patented Feb. 7, 1893.
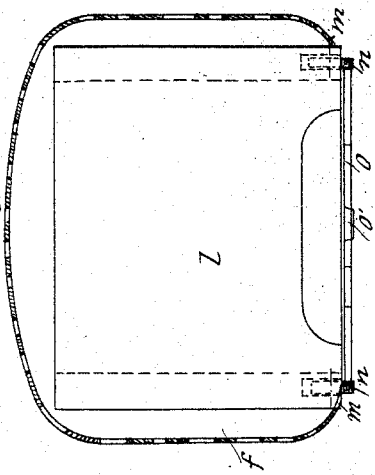
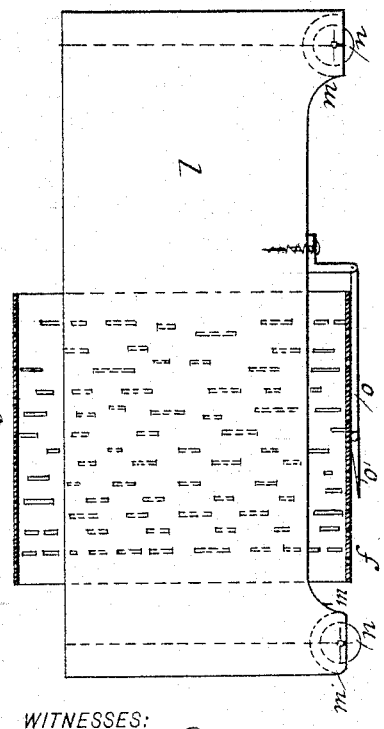
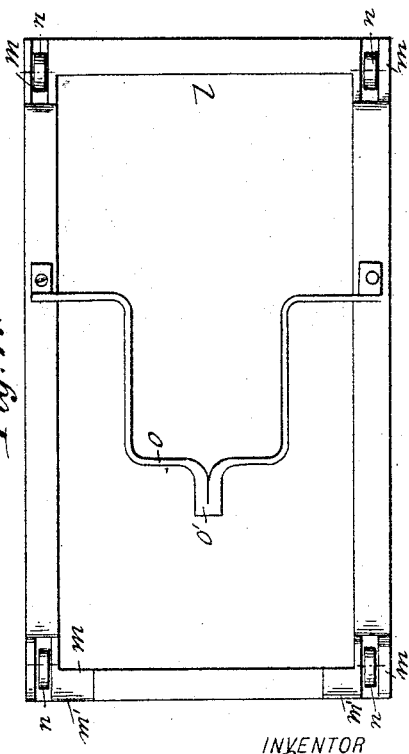

(No Model.) 6 Sheets—Sheet 5.
F. PIETSCHMANN.
MECHANICAL MUSICAL INSTRUMENT.
No. 491,223. Patented Feb. 7, 1893.
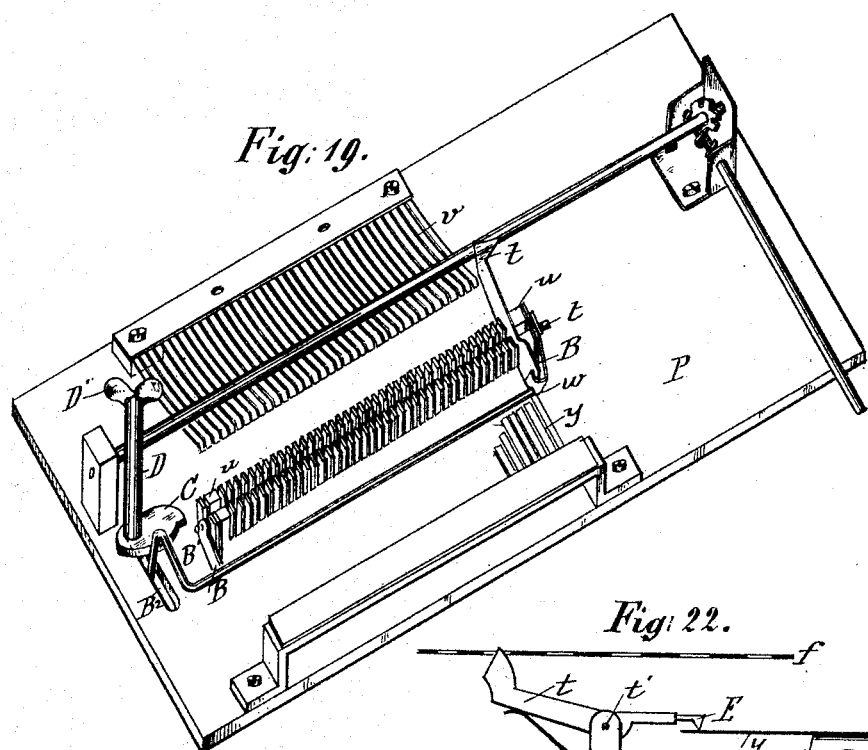
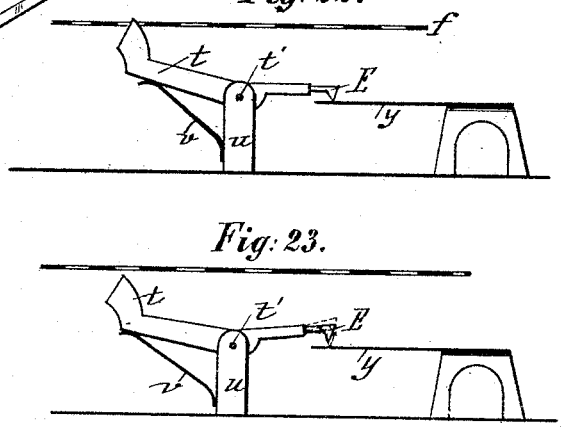
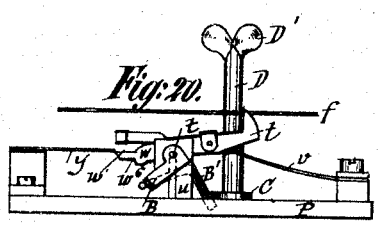
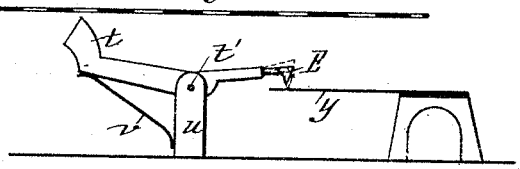
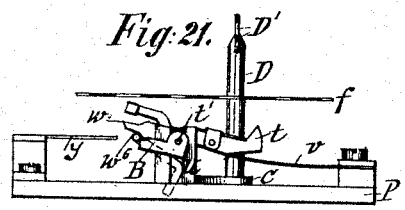
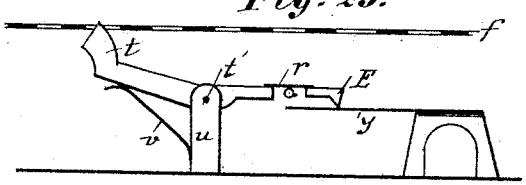
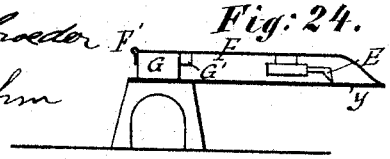
WITNESSES:
Charles Schroeder
William Diehm
INVENTOR
F. Pietschmann
BY Goepel & Rueger
ATTORNEYS.

(No Model.)  6 Sheets—Sheet 6.
F. PIETSCHMANN.
MECHANICAL MUSICAL INSTRUMENT.
No. 491,223. Patented Feb. 7, 1893.
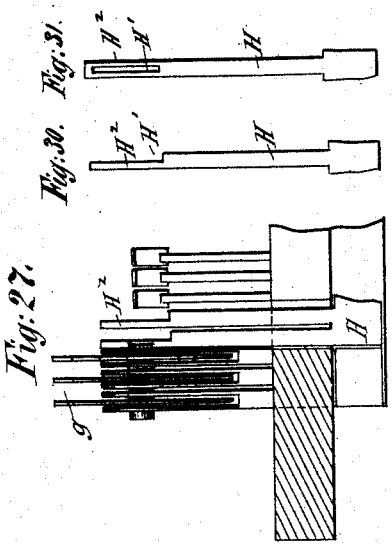
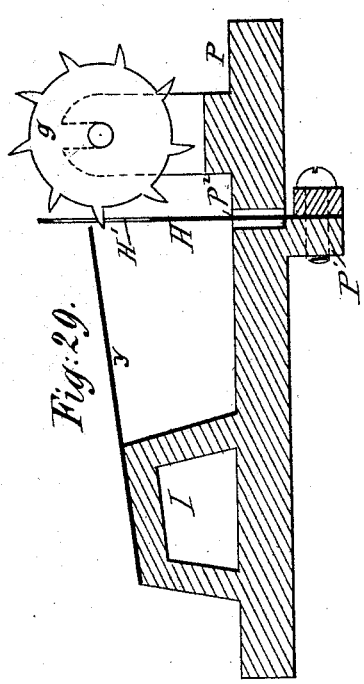
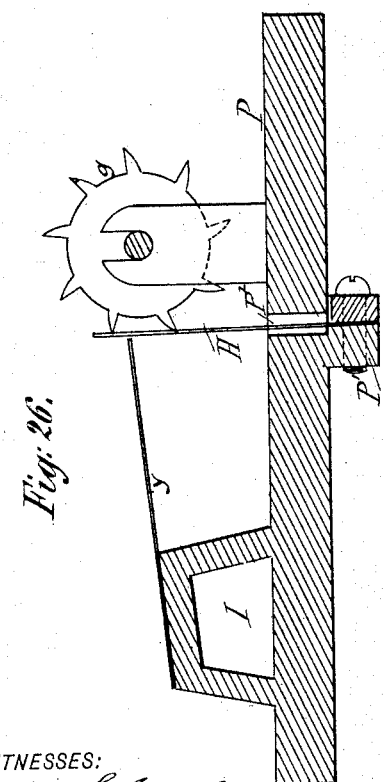
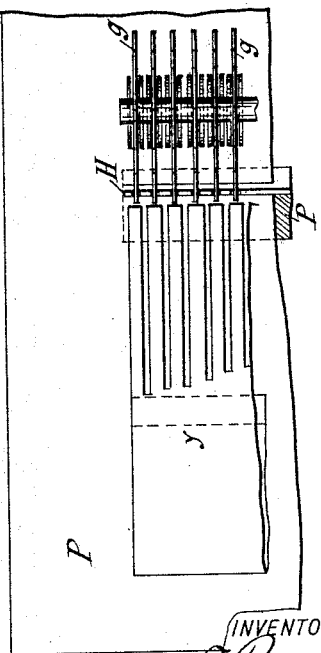
WITNESSES:
Charles Schroeder
William Duehm
INVENTOR
F. Pietschmann
BY
Guepel & Raegener
ATTORNEYS.

UNITED STATES PATENT OFFICE.

FERDINAND PIETSCHMANN, OF BERLIN, GERMANY.

MECHANICAL MUSICAL INSTRUMENT.

SPECIFICATION forming part of Letters Patent No. 491,223, dated February 7, 1893.

Application filed August 11, 1892. Serial No. 442,800. (No model.)

*To all whom it may concern:*

Be it known that I, FERDINAND PIETSCHMANN, a citizen of Germany, residing at Berlin, in the Empire of Germany, have invented certain new and useful Improvements in Mechanical Musical Instruments, of which the following is a specification.

My invention relates to improvements in the so-called automatical or mechanically-played instruments.

My invention consists, first, in a music sheet, formed in the shape of an endless metal band, composed of links jointed in a flexible and collapsible manner, without any objectionable intervals or breaks between the several links of the band or projecting parts, such as hinges, rivets and the like, which impair the uniform smooth traveling of the band.

My invention consists secondly, in a music sheet, provided with projections on the surface, which are stamped out of sheet metal, in such a manner, that the base-line or lines of the projecting pins of metal extend in the direction of the path of the sheet, whereby said projections are made stronger and are not liable to bend or break.

My invention consists, thirdly, in providing the casing with guides for the traveling music-sheet, which guides facilitate the adjustment of the band on the casing.

My invention consists, fourthly, of a suitable device for deflecting or temporarily making inoperative the push point levers and reed striking levers, for the purpose of preventing the music-wheel from being torn or injured by the push point levers during the exchanging of the music sheet.

My invention also consists in improved means for damping the reeds before they are struck and vibrated and numerous constructions and combination of parts and details, as will be fully described hereinafter and finally pointed out in the claims.

Figure 7:
Figure 8:
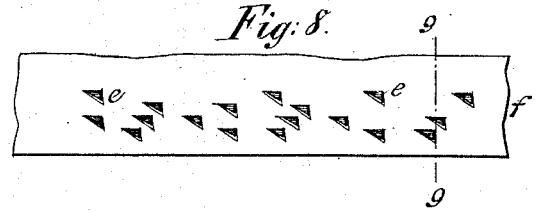
Figure 9:
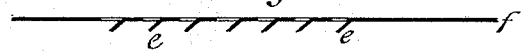
Figure 10:
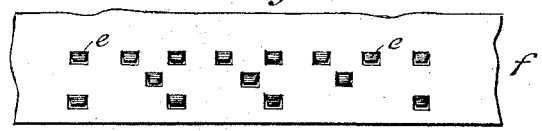
Figure 11:
Figure 12:
Figure 13:
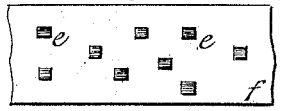

In the accompanying drawings, Figure 1 is a plan-view of part of my improved sheet-metal music sheet, the upper metal plates being removed. Fig. 2 is a plan-view of an upper plate as detached from the lower plate. Fig. 3 is a plan view of two links or jointed portions of the band before perforation. Fig. 4 is a plan-view of a series of links jointed together after perforation. Fig. 5 is a plan-view and cross-section of a modification of the construction of the link of the music-sheet, Fig. 6 is a side-view of the music-sheet, provided with projections. Fig. 7 is a side view of the sheet. Fig. 8 is a plan view of the same. Fig. 9 is an enlarged cross-sectional view on the line 9 9, of Fig. 8. Fig. 10 is a plan view of a modification. Fig. 11 is a side view of the same. Fig. 12 is a longitudinal sectional view of a further modification. Fig. 13 is a plan view of the same. Fig. 14 is a plan view of the casing. Fig. 15 is a longitudinal sectional view of the same, on line 15 15, Fig. 14. Fig. 16 is a side elevation of the casing of the music box, the sheet being in section. Fig. 17 is a plan-view of the underside of the same. Fig. 18 is an end elevation of the same, the music sheet being in section. Fig. 19 is a perspective view of the push point levers and striking levers of the mechanism and the device for locking the same. Fig. 20 is a side-view of the same, showing the normal position of the parts. Fig. 21 is a side view, showing the levers locked in their inoperative position. Fig. 22 is a section of the comb and a side-view of the vibrating lever and damper in a state of rest. Fig. 23 shows a damper and reed vibrating device. Fig. 24 is a similar view, showing a modification. Fig. 25 is a similar view, showing another modification. Fig. 26 is a longitudinal sectional mechanism, showing a modification of a damper. Fig. 27 is an elevation, parts being in section. Fig. 28 is a plan view. Fig. 29 is a section, showing the modification of the construction shown in Figs. 26, 27 and 28. Figs. 30 and 31 are elevations of two modifications of the damper lever.

Similar letters of reference indicate corresponding parts.

Referring to Figs. 1 to 5, the endless music sheet is composed of a series of links or plates jointed to each other by strips of suitable material, such as fabric, parchment, leather and the like. Each link of the music sheet consists of the sheet metal plate *a*, perfectly smooth on its faces and presenting no projecting parts of any kind, which could form an obstacle for the continuous and uniform motion of the sheet. The upper or inside surface of said plates *a* is preferably made rough or prepared for the better adhesion of glue or a cement or other binding substances by which the sheet *b* of fabric or other suitable material is secured to the plate *a*. The joint of every two adjacent plates *a* is formed by a strip *c* of suitable flexible material, such as linen or other fabric, or thin leather, said strip overlapping the ends of the two adjacent plates *a* and being secured thereto by a suitable adhesive cement. The sheet *b* preferably has the same thickness as the strip *c*. On the said sheet *b* and strip *c* another metal plate *d* of exactly the same size as the plate *a* is mounted and is secured by suitable cement, and I prefer to still better secure the ends of each plate *d* to the flexible strip *c* by indentations or impressions, as shown in Figs. 4 and 5, which impressions, however, are only provided on one surface of the music-sheet, the other lower surface remaining perfectly plain and smooth. The joints of the several links having no projecting parts, possess great flexibility on account of the strips *c* secured between the plates *a* and *d*.

Instead of gluing and cementing the plates *a* and *d* to each other, in some cases they may be secured to each other by folding the edge of one plate *a*, for example, over the edges of the plate *d*, as shown in Fig. 5. In this case the plate *a* has greater width than the other plate *d*, the projecting part of the plate *a* overlapping the edges of the plate *d*. This prevents the splitting of the links which may occur if the links are composed of two plates glued to each other and the glue becomes soft or brittle.

In place of forming the links or jointed portions of the music sheet of two metal plates laid one over the other, as described, a still more convenient mode for forming the said links may be adapted by making the said links or jointed portions, each of a plate of sheet metal, such as plate *a*, the adjacent sides of every two plates being jointed by overlapping strips, as described, and the two sides of said plate, or one side only may be lined with paper, parchment or a suitable woven or other material, the lining being applied by glue, cement or binding material. The advantages of this construction are that it is more simple and allows of covering surfaces of the sheet with printed notes or inscriptions and the metal is better guarded against oxidation.

Figs. 6 to 13 illustrate the improved music sheet with projections on the surface. Metal music sheets of this kind heretofore had the pins or projections stamped from the metal and bent to project from the surface of the same and they were so arranged that their base or edge which connects the projection with the middle of the sheet extended across or at right angles to the line of motion of the sheet. Such projections are liable to be bent and break under the resistance of the points or pins against which said projections strike when the instrument is playing. To prevent this bending or breaking the projections have been strengthened or reinforced in various manners and although their durability has thereby increased, bending and breaking has not been sufficiently obviated. The projections *e* are of triangular shape and are bent to take an inclined position with reference to the plane of the sheet, as shown in Fig. 9. The base line of each projection extends in the direction of motion of the sheet and the teeth or pins of the wheel *g* are struck by the front edge of the triangular projection. If the said projections *e* were bent to be in a vertical position on the plane of the sheet or band *f*, their bearing surface against the teeth or pins of the wheels *g* would be limited to the thickness of the sheet metal, and consequently, said projections *e* would easily slide past said narrow teeth or pins without striking the same. The inclined position of the projections *e* therefore is of particular importance, because the width of the front edge of the projections forms a bearing or striking surface for said pins *e*. As the base line of each projection *e* extends in the direction of motion, the said projections are not liable to be broken off. I prefer the triangular shape of the projection *e* as it offers advantages in arranging the lines or staves closely to each other, but they may be rectangular, as shown in Figs. 10 and 11, the inclined position, as shown in Fig. 9, being essential with any of these shapes. As shown in Figs. 12 and 13, the projections *e* form a kind of bridge or eye projection from the plane of the music sheet *f*, that is the strip of metal pressed or stamped from the sheet is connected with the sheet at both ends instead of one end only. The base line of each projection *e* extends in the longitudinal direction of the staves of the music sheet and the said bridges or projections *e* strike against the teeth or points of the wheel *g* with their front edge. The shape of the bridge *e* may be rounded, as shown in Fig. 12, or it may be angular. Projections of this kind will possess a still greater resistance against the teeth or points to be struck and breaking is almost rendered impossible in the course of longer use.

Figs. 14 and 15 show the guides on the casing for the traveling music sheet. The top plate *h* of the casing is made of sheet metal, or may be cast, compressed or otherwise suitably formed of other suitable material. The said top plate is provided with two guides or ledges *k* made integral with the same. Said guides *k* between which the music sheet travels and by which it is bound to follow a straight course are exactly parallel to each other, and as they are made integral with the top plate as stated, in place of being glued, tacked, riveted or screwed on, they at all times retain their parallelism, which could only be maintained with difficulty in strips attached to said top-plate.

The legs *m* of the casing *l* are provided with casters or rollers *n* which project from the bottoms of said feet about one-eighth of an inch. The outer edges of said feet are preferably rounded off on one side of the casing, as shown in Figs. 16 and 17. The endless music sheet is held open with its lower surface resting on a table. By rolling the box or casing $l$ toward the open sheet $f$, the said box slides into the sheet, the rounded edges facilitating the free passage. The music sheet traveling in the direction of the box or casing, when free, would slide with its lower surface on the table and thereby produce a noise, which would be objectionable. To avoid this, I provide on the underside of the casing $l$ a suitable guide $o$, consisting preferably of a wire, as shown, and having at its forward end a tongue $o'$, said tongue being slightly beveled and bent down to touch the table. As the box $l$ is passed into the endless music sheet $f$, the wheels or rollers have passed over the edge of the sheet or band, the tongue $o'$ shifts itself below said band and guides the band upon the rest $o$. If desired, the said rest may be covered with some suitable soft material to prevent noise.

Referring to Figs. 19, 20 and 21, upon the shaft $t'$ of a series of levers $t$, a bail B is pivotally mounted and is provided at one side with an arm B' extending into the slot B² of the base plate P. The said bail normally keeps the position shown in Fig. 20, as it drops by gravity. A cam C mounted on the vertical pin or shaft D bears against said arm B' of the bail B when the shaft is turned in its socket in the plate P. In the normal position of the said shaft D the cam C has no bearing against the arm B' of the bail B, but when said shaft is caused to make a quarter of a turn the cam works against the arm B' and lifts the bail into the position shown in Fig. 21. The back of said bail while being raised passes into the recess or shoulders $w^6$ formed in the lower edge of each striking lever $w$ and forces the set of said levers from the ends of the set of reeds $y$. As the bail B is raised farther up and the push point levers $t$ are correspondingly lowered, the striking points $w'$ of the levers $w$ freely pass the reeds $y$. The levers $w$ and $t$ are locked in their positions as shown in Fig. 21, as long as the cam C bears against the arm of the bail B. The shaft or pin D is preferably provided with a thumb piece or handle D', which extends through a corresponding slot of the abutment stay of the music sheet, not shown in the drawings. While the said shaft D is in its normal position, the thumb piece D' is at right angles to the slot of the stay through which it extends and thereby keeps said stay locked in its vertical position. When the music sheet is to be exchanged, the said abutment stay must be raised, and for raising the same, the thumb piece of the shaft D, which keeps the stay in locked position must be released and caused to make a quarter turn to place the thumb rest parallel to the slot. While turning the said thumb piece, the cam C on the shaft D raises the bail B and renders the push point and striking levers inoperative by merely releasing the abutment-stay of the music sheet and without requiring any particular attention or manipulation. The damage frequently done to the music sheet by the said levers while exchanging the sheet is thereby entirely prevented.

Referring to Figs. 22 to 25, the damper E consists of a piece of rubber or similar elastic material carried in a position which allows of the freely swinging motion to its head or point, which latter makes contact with the reed, whereby the damper is enabled to follow the vibrations of the reed. The damper thus does not only damp the sound completely but is noiseless.

In Figs. 22 and 23, the damper E is carried by a suitable sleeve, socket or clamp of the push point lever $t$. The striking lever or striking device controlled by the push point lever is not shown in these figures, as said striking device may be arranged in a variety of ways.

In the construction shown in Fig. 24, the damper is attached to a separate lever F hinged to the supporting block G at F'. This arrangement is preferable where the reeds $y$ are struck by the pins of the rotating barrel, as the pins in this case strike the reed and simultaneously raise the lever $t$, lift the damper E out of contact with the reed. When the said lever F slides off the pin which raises the same, the lever falls down and the damper causes the vibration of the reed to cease. A bolster or cushion G' may be suitably arranged below the lever F, which bolster causes the lever F to vibrate as it falls down and as the vibration of the lever F and thus of the reed $y$ will meet the point of the damper E, comes into immediate soft and elastic contact with the reed $y$ and the reeds are thus immediately and instantaneously silenced.

As shown in Fig. 25, the damper E may be secured to the spring $r$, whereby greater elasticity is obtained. Another construction of damper mechanism for the sheet-metal reeds is shown in Figs. 26 to 31. The dampers consist of flat metal springs H which bear against the narrow front ends of the reeds $y$ secured on the bridge I. The springs are forced into contact with the front edges of the metal reeds $y$ by the pressure of the teeth of the wheel $g$ or the pin of a barrel, which pins in the rotation of the barrel strike the reed and the said tooth or pin, before reaching the reed have a sliding contact with the pin H and deflect the same by a slight pressure to such an extent as to cause its upper end to come in contact with the reed which accordingly ceases to vibrate. When the sliding contact of the tooth or pin H is released the said spring returns from the reed by its own elasticity and the reed is left in a state of rest. The tooth of the wheel $g$ and the pin of the barrel after leaving the spring H strike the reed and produce a sound. In order to enable the said tooth and pin to first deflect the spring H and then strike the reed, I provide the said spring H with a recess or slot H' at or near its upper end. The tooth or pin having deflected the spring by bearing against its lower portion enters into the said recess or slot H and thereby becomes free of the damper spring. To the lower side of the base plate P a ridge or bar is secured or formed on the same to which the springs H are screwed or otherwise suitably fastened and extend upward to the slot P² of said plate P. The free or upper ends of said springs H in their normal position are kept at a slight distance from the front ends of the reeds $y$ and return into their normal position by their own elasticity, when the tooth or pin after deflecting the spring has entered into the recess or slot H'.

Having thus described my invention, I claim as new and desire to secure by Letters Patent:—

1. A music sheet for mechanical musical instruments, composed of a series of links jointed together, each link being composed of two plates of sheet metal secured to each other, face to face, substantially as set forth.

2. A music sheet for mechanical musical instruments, composed of a series of links united by flexible strips attached to said links, each link being composed of two plates fastened to each other face to face, substantially as set forth.

3. A music sheet for mechanical musical instruments, composed of metal plates having parts forced out to form projections, which projections are at an inclination to the vertical longitudinal plane through the sheet, substantially as set forth.

4. A music sheet for mechanical musical instruments, composed of metal plates having parts punched out to form projections, said projections being at an inclination to the longitudinal vertical axis of the sheet and the base of each projection or part of the projection connected with the plate being parallel with the direction of the movement of the sheet, substantially as set forth.

5. In a mechanical musical instrument, a cover or top-plate having ledge or guide bars for guiding the music sheet, made integral with said top-plate, substantially as set forth.

6. In a mechanical musical instrument, the combination, with the push point and striking levers, of a bail mounted pivotally on the axis of said levers, a stem turning in the base plate, a cam secured to said stem, and an arm on the bail on which arm the cam can act, substantially as set forth.

7. In a mechanical musical instrument, the combination, with a set of reeds, of an independent damper provided for each reed, said dampers consisting of elastic material and resting on the tongues or reeds, substantially as set forth.

8. In a mechanical musical instrument, the combination, with a set of levers, of a damper for each reed, said damper consisting of a spring strip having a recess or slot at or near the upper end, which spring is held a short distance from the end of the reed or tongue, substantially as set forth.

9. In a mechanical musical instrument, the combination, with a casing having rollers, of a support for the music band on the underside of said casing, and a tapering link on the end of said support or arm, substantially as set forth.

In testimony that I claim the foregoing as my invention I have signed my name in presence of two subscribing witnesses.

FERDINAND PIETSCHMANN.

Witnesses:
 ARD. LEHMANN,
 GEORG REICHELT.